Nov. 14, 1944.     O. V. MALMQUIST     2,362,707
QUICK-ACTING CLAMP
Filed May 3, 1943
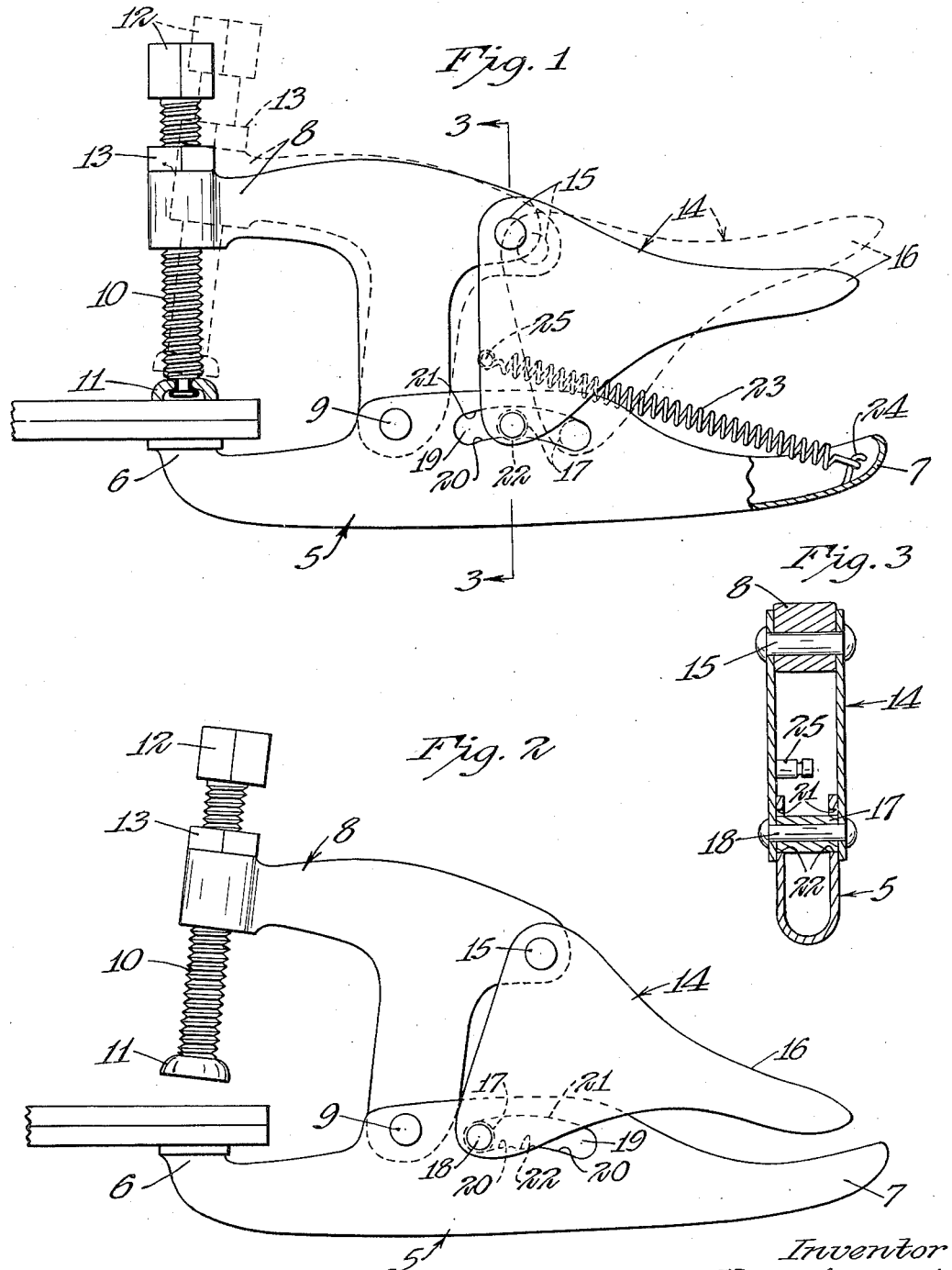

Patented Nov. 14, 1944

2,362,707

UNITED STATES PATENT OFFICE 2,362,707

QUICK-ACTING CLAMP

Oscar V. Malmquist, Minneapolis, Minn.

Application May 3, 1943, Serial No. 485,474

7 Claims. (Cl. 144—302)

My present invention relates to a quick-acting hand clamp for temporarily holding two or more work pieces together while other operations, such as welding thereof together, are being accomplished and has as its principal object the provision of a hand clamp which can be both applied and removed from the work with one hand.

Hand clamps are extensively used in industry for holding work pieces, such as sheet metal parts, together during welding operations, and while some thereof can be applied to the work, clamped on to the work and locked in a clamped position all with one hand, most devices now in use require two hands to release and remove the clamp, and this has a decided disadvantage and slows down the work materially because a welder is usually forced to set down his welding tools, normally contained in the other hand, for the purpose of removing the clamp.

My invention provides a simple, inexpensive and easily operated hand clamp involving clamping jaws and a pair of handles adapted to be operated by one hand and wherein a continuous unidirectional movement of the handles toward one another will result, first, in closing of the clamping jaws and then opening of the clamping jaws. Furthermore, means is provided in my improved clamp for retaining the jaws in relatively closed clamping positions against pressure applied through the jaws, so that the operator, starting with the jaws in an open position and the handles spread to maximum, may clamp the jaws on the work by imparting a squeezing movement between the handles and then, when the welding or other work operation is complete, the operator need only reach down with one hand and continue the squeezing movement between the levers to effect quick releasing of the clamp. Preferably yielding means, such as a suitable spring, is provided for returning the handles to their starting positions when released from hand pressure and free of the work.

Another object of the invention is the provision, in a clamp for the general purpose set forth, of a novel jaw construction for effecting parallel engagement between opposite gripping surfaces of the cooperating jaws and the opposite flat surfaces of an interposed work piece, regardless of whether such work piece surfaces are parallel or flaring.

The above and numerous other objects and advantages of the invention will be made apparent from the following specification, claims and appended drawing.

In the accompanying drawing like characters indicate like parts throughout the several views.

Fig. 1 is a view of the improved clamp in side elevation with some parts broken away and some parts shown in section;

Fig. 2 is a view similar to Fig. 1 but showing a somewhat different position of certain parts; and Fig. 3 is a detail sectional view taken on the line 3—3 of Fig. 1.

The improved clamp involves a fixed lever element 5 formed at its front end to provide a fixed jaw 6 and at its rear end portion to provide a handle 7. This fixed lever element 5, as shown, is formed of sheet metal pressed into upwardly opening channel-shaped formation. Pivotally anchored to the longitudinally intermediate portion of the fixed lever 5 is a movable jaw element 8. This jaw element 8 is preferably a cast or drop forged part and extends between the opposed upwardly extended flanges of the channel-shaped element 5 and is pivoted therebetween on a headed rivet, or the like, 9. Extending through the head or free end of the movable jaw element 8, and comprising part thereof, is a work thickness adjusting screw 10 carrying a work-engaging head 11 and having a rigid angular head 12. The screw 10 has threaded engagement with the jaw element 8, is adjustable to accommodate the tool to work pieces of varying thicknesses, and is locked in a desired position by means of a lock nut 13. As will be seen by reference to the drawing, adjustments of the screw to accommodate the clamp to work of different thicknesses is desirable for the reason that the throw of the jaws is limited for the purpose of quick action in production operations wherein the tool is used repeatedly on work pieces of the same character.

The work-engaging head 11 of the screw 10 is, as will be seen by reference to Fig. 1, loosely swivelled on the end of the screw so that it is free for wobbling movements thereon, thereby permitting parallel engagement of the work-engaging surfaces of the jaws with opposite flat surfaces of a work piece regardless of whether such surfaces be parallel or diverging or whether the screw 10 be at right angles to the work-engaging surface of the fixed jaw or be tilted by reason of pivotal movement between the jaws.

The movable jaw element is more or less T shaped and has a rearwardly extended intermediate portion to which an operating lever 14 is pivotally connected at 15 by a rivet or the like. The operating lever 14 is preferably also stamped from sheet metal and is cross sectionally channel-shaped providing an operating handle 16 at its rear end portion for cooperation with the handle 7 of the fixed lever element. The rearwardly extended intermediate portion of the movable jaw element 8 is extended between opposite flanges of the channel-shaped operating lever 14, and the depending flanges of said channel-shaped lever 14 overlap and receive between them the upwardly extended channels of the fixed lever element 5, which latter are formed with segmental slots 19 providing cam surfaces 20 and guide surfaces 21.

Extending between the lower ends of the depending flanges of operating lever 14 and working through the segmental slots 19 is a roller 17 that is journalled between the said depending flanges of lever 14 on a riveted pin 18. The roller 17 comprises part of the lever 14 and provides an efficient cam follower that works over the surfaces 20 of the cam and has its limits of movement established by the ends of the slots which provide effective stops.

It will be noted, by reference to Figs. 1 and 2, that the cams are provided, at their longitudinal intermediate portions, with depressions 22 of just sufficient depth to lock the cam follower roller against movement under pressure exerted through the jaws, but of insufficient depth to permit material jaw-releasing movement or to stop the cam following roller against movement applied through the operating lever 14.

Now it will be noted that the limits of pivotal movement of the movable jaw element 8 are established by the limits of movement of the cam following roller 17 and that, in the preferred construction illustrated, the entire cam and the entire arc of movement of the axis of the pivot 15 are rearwardly of the axis of pivot 9. Furthermore, it will be seen that, in the preferred construction illustrated, the cam surface 20 is so laid out with respect to the arc of movement of the pivot 15, that the linear distance between opposite ends of the cam surfaces 20 and the axis of pivot 15 in its jaw open position (shown by dotted lines) is less than the linear distance between the said position of the axis of pivot 15 and the longitudinally intermediate portions of the cam surfaces 20. In other words it will be seen that the high points of the cam surfaces 20 with respect to the jaw open position of the axis of pivot 15 is at the longitudinal centers of the cams. Hence, it will follow that, starting with the parts all positioned, as shown by dotted lines in Fig. 1, initial downward movement of the handle 16 of operating lever 14 will result in closing movement of the movable jaw element 8 which will reach its maximum when the operating lever reaches the full line position of Fig. 1, and at which time the cam following roller 17 will come into the depression 22 and lock the clamp in engagement with the work.

Obviously now, to release the clamp from the work, it is merely necessary to again grasp the handles 16 and 7 in one hand and continue downward movement of the handle 16 toward handle 7 until the roller 17 reaches the front end of the slot, all as shown by full lines in Fig. 2.

For the purpose of returning the parts to their open positions, as shown by dotted lines in Fig. 1, after the clamp has been released from the work and from the operator's hand pressure, I provide a coil tension spring 23 that is anchored at one end to the inside of handle 7 by a pressed-out hook portion 24 and is anchored at its other end to the depending flanges of operating lever 14 through the medium of an inwardly projecting pin 25 carried by one of said flanges.

What I claim is:

1. A quick-acting hand clamp comprising a stationary lever element providing a fixed jaw at its front end portion and a handle at its rear end portion, a movable jaw element pivoted to the intermediate portion of the fixed lever element for co-action with the fixed jaw, and an operating lever extending between the fixed lever element and an intermediate portion of the pivoted jaw element being pivoted to one of said elements and having cam and cam follower engagement with the other of said elements, of the cam and cam follower one thereof being on the stationary lever element and the other thereof being on the operating lever, said cam providing a continuous cam surface whose intermediate portion is constructed to act upon the follower to close the jaws and whose end portions are constructed to act upon the follower to open the jaws as the follower moves away from the intermediate portion in either direction, said cam being formed at its intermediate portion with a shallow transverse channel wherein the cam follower will be locked against movement resulting from pressure applied between the jaws.

2. A quick-acting hand clamp comprising a stationary lever providing a relatively fixed jaw at its front end portion and a handle at its rear end portion, a movable jaw pivoted to the intermediate portion of the fixed lever for co-action with the fixed jaw thereof, an operating lever pivoted to the intermediate portion of a movable jaw and having a handle portion for cooperation with the handle of the fixed lever, a cam follower on the movable lever in spaced relation to the said pivot thereof, and a cooperating cam on the fixed lever, said cam providing a continuous cam surface whose intermediate portion is constructed to act upon the follower to close the jaws and whose end portions are constructed to act upon the follower to open the jaws as the follower moves away from the intermediate portion in either direction, whereby a continuous unidirectional movement of the operating lever will impart both closing and opening movements to the pivoted jaw.

3. The structure defined in claim 1 in which the cam and cam follower are located rearwardly of the axis of the pivotal connection between the fixed lever element and movable jaw element.

4. A quick-acting hand clamp comprising a stationary lever providing a relatively fixed jaw at its front end portion and a handle at its rear end portion, a movable jaw pivoted to the intermediate portion of the fixed lever for co-action with the fixed jaw thereof, an operating lever pivoted to the intermediate portion of a movable jaw and having a handle portion for cooperation with the handle of the fixed lever, a cam follower on the movable lever in spaced relation to the said pivot thereof, and a cooperating cam on the fixed lever, said cam providing a continuous cam surface whose intermediate portion is constructed to act upon the follower to close the jaws and whose end portions are constructed to act upon the follower to open the jaws as the follower moves away from the intermediate portion in either direction, said cam being formed at its intermediate jaw-closing position with a depression wherein the cam follower will be locked against movement resulting from force applied through the jaws.

5. A quick-acting hand clamp comprising a stationary lever element providing a relatively fixed jaw at its front end portion and a handle at its rear end portion, a movable jaw element pivoted to the intermediate portion of the fixed lever element for co-action with the fixed jaw element, a movable lever element pivoted to the intermediate portion of the movable jaw element and having an operating handle thereon, a cam follower on the movable lever element in spaced relation to the said pivot thereof, and a cooperating elongated cam on the fixed lever element providing opposite ends and an intermediate portion, stop portions establishing limits of movement of the cam follower on the cam and resultant pivotal movements of the movable jaw element on its pivot, said cam and the entire arc of movement of the pivotal connection between the operating lever and movable jaw element being located rearwardly of the pivotal connection between the movable jaw element and fixed lever element, the linear distance between opposite ends of the cam and the jaw open position of the axis of the pivot between the operating lever and movable jaw element being greater than the distance between said pivot axis in said position and the longitudinal intermediate portion of the cam, whereby a continuous uni-directional movement of the operating lever will impart closing and opening movements to the movable jaw element.

6. The structure defined in claim 5 in which the cam is formed at its high point with a shallow transverse channel wherein the cam follower will be locked against movement resulting from pressure applied between the jaws.

7. A quick-acting hand clamp comprising a stationary lever providing a relatively fixed jaw at its front end portion and a handle at its rear end portion, a movable jaw pivoted to the intermediate portion of the fixed lever for co-action with the fixed jaw thereof, an operating lever pivoted to the intermediate portion of a movable jaw and having a handle portion for cooperation with the handle of the fixed lever, a cam follower on the movable lever in spaced relation to the said pivot thereof, and a cooperating cam on the fixed lever, said cam providing a continuous cam surface whose intermediate portion is constructed to act upon the follower to close the jaws and whose end portions are constructed to act upon the follower to open the jaws as the follower moves away from the intermediate portion in either direction, the said fixed lever element being in the nature of an upwardly opening channel in cross section, said movable jaw element being pivoted between opposite walls of the channel-shaped fixed lever element, the said movable lever element being in the nature of a downwardly opening channel in cross section and having flanges that overlap the outer walls of the channel-shaped fixed lever element, the walls of the said fixed lever element being slotted to provide laterally spaced cams, and said cam follower being in the nature of a roller pivoted to and extending between opposite depending flanges of the channel-shaped operating lever and through the cam-forming slots of the fixed lever element.

OSCAR V. MALMQUIST.